United States Patent [19]

Oswitch et al.

[11] 3,917,790

[45] Nov. 4, 1975

[54] PROCESS FOR MOLDING WITH PRE-FABRICATED GEL COATS

[75] Inventors: Stanley Oswitch, University Heights; Kevin K. Kipp, Solon, both of Ohio

[73] Assignee: Ferro Corporation, Cleveland, Ohio

[22] Filed: Feb. 20, 1974

[21] Appl. No.: 444,039

Related U.S. Application Data

[60] Division of Ser. No. 321,584, Jan. 8, 1973, Pat. No. 3,812,074, which is a continuation-in-part of Ser. No. 199,752, Nov. 17, 1971, Pat. No. 3,770,690, which is a continuation of Ser. No. 43,213, June 3, 1970, abandoned.

[52] U.S. Cl. .................................. 264/267; 264/259
[51] Int. Cl.² ............................................ B29D 3/00
[58] Field of Search ........... 264/122, 255, 338, 259, 264/267

[56] References Cited
UNITED STATES PATENTS

| | | | |
|---|---|---|---|
| 3,215,763 | 11/1965 | Buerger | 264/338 |
| 3,410,943 | 11/1968 | Rosenberger et al. | 264/255 |
| 3,597,425 | 8/1971 | Shaines | 264/255 |

*Primary Examiner*—Robert F. White
*Assistant Examiner*—J. R. Hall
*Attorney, Agent, or Firm*—Milton L. Simmons; Wesley B. Taylor

[57] ABSTRACT

A pre-fabricated gel coat is disclosed in the form of a dry sheet that can be easily handled and preshaped for lining a mold. The pre-fabricated gel coat comprises a layer of partially cured, curable, thermosetting polyester resin, and a fibrous reinforcing medium of thermoplastic fibers. The fibers have a softening temperature no higher than that of a heating operation to which the gel coat is to be subjected such as a molding operation. When heated, the partially cured resin and the thermoplastic fibers soften to permit the gel coat to flow and accommodate itself to a desired, nonplanar configuration with subsequent final cure of the thermosetting polyester resin in the desired nonplanar configuration. The gel coat is used to line a mold in which a heat-settable resin and curable polyester resin may be cured substantially simultaneously to form a product of the heat-settable resin having a covering of the gel coat. Simultaneous cure of a heat-settable resin and the gel coat within a mold avoids the messiness and nonuniform thickness resulting from brushing or spray coating molds prior to molding and considerably reduces the time required for the total molding operation. The thermosetting polyester resin preferably contains an unsaturated crosslinker that is solid at room temperatures to facilitate retention of a dry form for the pre-fabricated gel coat. The thermoplastic fibers comprise a resin compatible with the thermosetting polyester resin of the gel coat, such as a thermoplastic saturated polyester resin.

5 Claims, No Drawings

PROCESS FOR MOLDING WITH PRE-FABRICATED GEL COATS

CROSS-REFERENCE TO RELATED APPLICATIONS

This is a division of an application, Ser. No. 321,584, filed Jan. 8, 1973, now U.S. Pat. 3,812,074 which was a continuation in part of an application entitled "Pre-Fabricated Gel Coats," filed Nov. 17, 1971, Ser. No. 199,752, now U.S. Pat. No. 3,770,690, which was a continuation of an application entitled Pre-Fabricated Gel Coats, filed June 3, 1970, Ser. No. 43,213, now abandoned. Another related case directed to gel coats containing epoxy resins was filed on Aug. 6, 1973, Ser. No. 385,793, now U.S. Pat. No. 3,848,045.

BACKGROUND OF THE INVENTION

1. Field of the Invention

This invention relates to a gel coat in dry sheet form that is easily handled and can be preshaped, for example, to fit a mold. More specifically, it relates to a pre-fabricated gel coat comprising a layer of a partially cured, curable, thermosetting polyester resin and a fibrous reinforcing medium of thermoplastic fibers having a softening temperature no higher than that of a molding temperature used, for example, to mold a resin defining a back-up system to be covered by the gel coat.

2. Related Prior Art

It is common practice in molding compositions of resin and fiber glass to provide an exterior layer of a resin to impart a smooth surface to the molded product. This is generally accomplished by spraying or brushing a liquid gel coat onto the interior surface of a mold to be used. After the mold is coated in this manner, the molding composition is added and the necessary heat and pressure applied to complete the molding operation.

Gel coats presently in use, as for press molding operations, contain a resin that is liquid and flowable prior to the actual molding operation. The application of a gel coat either by hot spraying or brushing is, therefore, a messy procedure and results in uneven coatings. In some areas, the coating may be too thin while in other areas the coating is too thick. Such prior application techniques excessively waste gel coating material and are time consuming, causing a slower rate of production. Further, fibrous reinforcement, such as glass fibers, within a gel coat layer has not adapted well when the gel coat is to be shaped as in lining a mold. Fibers like glass fibers do not uniformly adjust to a nonplanar configuration in that they do not flow or accommodate themselves to a curving or undulating surface. Such fibers tend to bunch or congregate at space intervals instead of maintaining a desired, fairly even distribution.

SUMMARY OF THE INVENTION

In accordance with the present invention, a gel coat is pre-fabricated in a dry sheet form that can be easily handled and preformed to fit a site of application, such as the interior of a mold, and thereafter initially fused and then cured substantially simultaneously with a heat-settable molding resin that is placed in the mold. A leading advantage of the present invention resides in the use of a dry sheet. This provides an accurate control of the gel coat thickness, completely eliminates overspray of a sprayed liquid system and its attendant problems, and simplifies inventory since the present sheet has a long storable shelf life at ambient temperatures.

The resin of the gel coat is a partially cured, curable polyester and preferably an alkyd resin. To acquire thermosetting properties, the polyester is unsaturated and of the cross-linking type and includes an unsaturated cross-linker. Preferably the cross-linker is solid at room temperatures, like diacetone acrylamide, in order to facilitate retention of the dry form for the pre-fabricated gel coat. The thermoplastic fibers must have a softening temperature no higher than the operating temperature of the molding operation or the like to which the gel coat is to be subjected. The thermoplastic fibers comprise a resin that is compatible with the thermosetting polyester resin of the gel coat, for example, a thermoplastic, saturated polyester resin.

When heated in use, the partially cured thermosetting polyester resin as well as the thermoplastic fibers of the gel coat fuse, so that both of these phases of the gel coat flow and accommodate themselves to a desired, nonplanar configuration. Further heating finally cures the thermosetting polyester resin, while upon cooling at least some, if not all, of the thermoplastic fibers retain their fibrous identity and serve to reinforce the gel coat covering.

When the heating and final cure of the gel coat accompany the heating of a heat-settable resin in a mold lined by the gel coat, a product is formed comprising the heat-settable resin and a covering of the gel coat. Accordingly, a further advantage of the present invention resides in an acceleration of the molding cycle, since the gel coat and the heat-settable material forming the bulk of the molded product are both cured in one single step.

DESCRIPTION OF THE PREFERRED EMBODIMENTS

The present dry gel coat comprises a solid, flexible, handleable sheet or layer adapted to stretch and flow to accommodate itself to nonplanar surfaces. The gel coat layer comprises two phases including a thermosetting polyester and compatible thermoplastic fibers having a softening temperature that is, for example, no higher than the maximum temperature of a heating operation, such as a heat-molding operation, to which the gel coat is to be subjected.

Thermosetting polyester resins useful in the present invention are those unsaturated polyesters known in the art and especially the alkyd resins. Unsaturated polyester resins suitable for the practice of the invention have a molecular weight in the range of about 800 to about 3,000 and an acid number of about 10 to about 40. These comprise polyesters derived from an unsaturated dibasic acid, or its anhydride, by reaction with a dihydric alcohol or glycol. Typical unsaturated anhydrides or acids are maleic, fumaric, methylmaleic, citraconic, etc.; and typical glycols are ethylene glycol, propylene glycol, butylene glycol, diethylene glycol, triethylene glycol, 1,4-cyclohexanedimethanol, hydrogenated bisphenol A, etc. The unsaturated dibasic acid may be replaced partially by dibasic anhydrides or acids not having reactive ethylenic unsaturation therein such as phthalic anhydride, adipic anhydride, endic anhydride (endomethylenetetrahydrophthalic anhydride), tetrabromophthalic anhydride, etc. Advantageously at least 30 percent, and preferably at least 50 percent of the anhydride is maleic or other unsaturated anhydride. The methods of preparation of the resins are well known in the art and many types are available commercially.

Normally, a cross-linker is present in the unsaturated polyester compositions to advance the polymerization to a thermoset stage. While as much as 30 percent of the cross-linker may be used, usually in monomeric form, generally less than 20 percent by weight of the polyester resin is preferred. It is within the contemplation of the invention to use cross-linkers which are liquid at room temperatures, such as styrene, diallyl phthalate, p-butylstyrene, and the like. The liquid cross-linkers can serve as a diluent or softening agent on the partially cured, thermosetting polyester resin. However, it is preferred to use a cross-linker that is solid at room temperatures, since a solid cross-linker facilitates the realization and retention of a dry form for the gel coat prior to its use and is less likely to escape as by evaporation if the gel coat is stored for extended periods of time. Cross-linkers which are solid at room temperatures (65° to 85°F) and which may be used include acrylamide, diacetone acrylamide, a dimer of diacetone acrylamide, dimethyl fumarate, diethyl fumarate, diallyl chlorendate, and diallyl melamine.

The thermoplastic fibers may comprise any fibers conventionally formed from a thermoplastic resin which is compatible with the thermosetting polyester resins. For example, thermoplastic fibers may be used of polyethylene, polypropylene, polyacrylic acid, polyacrylic esters, the polyvinyl resins such as polyvinyl chloride, polyvinyl acetate, and polyvinyl alcohol, cellulose acetate, ethyl cellulose, polystyrene, nylon, polyurethane, and the like. The preferred thermoplastic fibers comprise saturated thermoplastic polyesters because of their close chemical similarity to the unsaturated polyester resins. The fibrous reinforcing medium is preferably non-woven.

The gel coat layer or sheet may be prepared by warming a partially cured polyester resin to a semi-fluid state or by dissolving it in a solvent and applying a uniform layer of the semi-fluid resin or of the solvent and dissolved resin to a release paper by means of a gaged applicator. The resulting coating is then backed or covered with a reinforcing web or woven material of the thermoplastic fibers, the solvent evaporated, and the resin brought, if needed, to a more advanced polymeric state short of complete cure. The time and temperature of the heating to an advanced stage of polymeric growth is dependent upon particular polyester resin system used.

In a preferred practice, a solution of the reactants forming the polyester resin is prepared with an appropriate solvent, such as acetone, toluene, or xylene, and cast as a film on a release paper by means of a gaged draw bar. The film is heated in an oven to remove the solvent and effect a partial cure. Then, as previously described, a reinforcing fibrous layer is placed against the film. The thermoplastic fibers may either back a film of the thermosetting polyester resin as a simple laminate, or the fibers may be impregnated by or forced into the partially cured, thermosetting polyester resin film. In the latter case, light pressure may be applied on the reinforcing layer as by passing the film of polyester resin and web or veil of polyester fibers through a set of rollers. The purpose of the thermoplastic fibers is to add integrity to the gel coat while the thermosetting polyester resin is partially cured, allowing the gel coat to be cut, trimmed, or shaped prior to final cure; and to act as a surface veil hiding the underlying glass fiber pattern in the molded part when glass fibers are present. The fibers continue to act as a reinforcement after the gel coat is finally cured. As an example, the dry, pre-fabricated gel coat generally has an overall thickness of about 10 to about 25 mils, in which the curable, thermosetting polyester film comprises about 6 to 16 mils and the thermoplastic fiber reinforcement comprises about 3 to 10 mils in thickness. These sizes are not critical to the invention.

The availability and use of the dry, pre-fabricated gel coat of the present invention provide a number of advantages, including controlled, uniform thickness of the gel coat, cleaner and less wasteful operation, more ease and speed in handling, improved coverage of an underlying fiber pattern, reduced tendency for laminate warping, reduced tendency for gel coat crazing, blistering, cracking, sagging, sissing, and color variation, as well as the easy incorporation of other materials to give special properties such as abrasion resistance, conductivity, and the like, in the gel coat.

Although the present gel coat may be used in a variety of ways when positioned at a point of use to take advantage of its latent ability to advance to a final cure in a nonplanar configuration, a primary use of the gel coat is in lining a mold, especially a press mold, for substantially simultaneous curing with a heat-settable resin which fills the mold and forms the bulk of the molded product. In this practice of the invention, the dry flexible gel coat lines the inside, for example, of a female mold. It is possible to overlap sections of the gel coat or to pierce it without joining lines becoming apparent in the finished molded part. At this time, the partially cured polyester resin and cross-linker are substantially unreacted. The heat-settable resin, which may include chopped glass fibers, is next introduced into the mold.

As heat is applied, both the partially cured, curable polyester resin and the thermoplastic fibers fuse, so that the gel coat easily flows to accommodate itself to a nonplanar surface of the female mold, including any curving or flat surfaces, and as well to the shape of the male mold, as for example in molding a tray. The gel coat literally drapes itself uniformly along the mold in a matching configuration. As the heating continues, the cross-linker present initiates the final cure of the curable polyester resin and the heat-settable resin also advances to a final cure. Thus, at no time, is a solvent or liquid carrier needed to place the gel coat in a desired position. A product is thus formed of the heat-settable resin having an adherent covering of the gel coat.

There is little or no phase separation between the thermosetting polyester resin and the thermoplastic fibers during a forming and cure step. During the heating of the molding operation, the thermoplastic fibers do not bunch. Their softening enables the fibers to bend and otherwise assume a nonplanar configuration with the thermosetting polyester phase without substantially separating or segregating into spaced areas of densified fibers. Those fibers in the gel coat nearest the mold surface may sufficiently fuse to lose their fibrous identity. However, as a rule, at least some and generally all of the fibers retain their fibrous form and continue to reinforce the get coat. The gel coat may be reduced in thickness as a result of the molding operation, for example, to a thickness of about 5 to 15 mils. For cosmetic effects, the gel coat can be prepared in a variety of colors, or it may be prepared as a translucent coating where color is not important. A recommended cure schedule for use with pre-fabricated gel coats of the present invention is from about 250° to about 350°F for 2 to 5 minutes. Pressures may range from about 50 psi to about 400 psi.

The following examples are intended only to illustrate the invention and should not be construed to impose limitations upon the claims. Parts and percentages recited here and throughout the specification are by weight unless otherwise provided.

EXAMPLE 1

A partially cured polyester resin was conventionally prepared from maleic anhydride and ethylene glycol. The resin had a molecular weight of about 2,400 and an acid number of about 25 as used in the ultimate gel coat. While still in a low state of polymeric growth the resin was sheeted by standard means to form a sheet having a thickness of about 10 to about 20 mils which was then backed with a veil of a fibrous saturated polyester.

In preparing the sheet, the polyester material while in a state of low polymeric growth was applied to a sheet of "Mylar" (polyethylene terephthalate) release film by a 6 inch doctor blade mounted between two guides and adjusted to provide a sheet having a thickness of about 10 to about 20 mils. After being cast, the sheet was heated for about 6 minutes at 125°C, after which a nonwoven polyester fiber product sold under the trademark "PELLON" was placed atop the resinous polyester sheet.

The resulting reinforced sheet was then used to line the inner surface of a mold, and the mold filled with a glass fiber impregnated polyester resin. A molding operation was carried out at about 120°C to about 150°C for 10 minutes. A smooth molded surface was obtained with the outer covering formed from the gel coat being integrally molded to the back-up resinous system of the molded product. As described in Example 1 of our cited U.S. Pat. No. 3,848,045, an epoxy resin may be used in place of the polyester resin in filling the mold.

EXAMPLE 2

The procedure of Example 1 was repeated with similar satisfactory results, using as the thermosetting polyester resin an alkyd resin prepared from one mole of fumaric acid, one mole of endic anhydride, and two moles of 1,4-cyclohexamedimethanol with an acid number of 30 and a molecular weight of about 3,000.

EXAMPLE 3

The procedure of Example 1 was repeated with similar satisfactory results, using as the thermosetting polyester resin one prepared from 1.4 moles of maleic anhydride, one mole of tetrabromophthalic anhydride, and 2.4 moles of propylene glycol with an acid number of 20 and a molecular weight of 3,500.

EXAMPLE 4

The procedure of Example 1 was repeated with similar satisfactory results, using as the thermosetting polyester resin phase of the resulting reinforced sheet the following formulation in parts by weight:

| | |
|---|---|
| Polyester resin of Example 1 | 70 to 90 |
| Diallyl phthalate | 5 to 25 |
| Diacetone acrylamide | 5 to 25 |
| t-Butyl perbenzoate | 0.5 to 2.0 |
| Filler | 30 to 100 |
| Organic solvent | 30 to 100 |

In place of the polyester resin of Example 1, those of Examples 2 and 3 and still other thermosetting polyester resins could have been used. The organic solvent is not critical and can comprise, for example, acetone, toluene, benzene, xylene, or blends of the same.

It is understood that additives may be incorporated in the present gel coat such as conventional pigments and fillers. Fillers, for example, may include calcium carbonate, fumed alumina, silica, clays, barium sulfate, asbestos, talc, etc. added in an amount of about 5 to about 25 parts per 100 parts of resin. Fumed alumina is a commercially available alumina of extremely small particle size having diameters of less than 1 micron, and preferably less than 0.5 micron. It is predominantly alumina in the gamma crystalline form and is produced by the hydrolysis of $AlCl_3$ in a flame process to approximately 99 percent alumina with a specific gravity of about 3.6 and refractive index of 1.7. A preferred particle size of fumed alumina has an average particle diameter of about 0.03 micron. Still other known additives may be incorporated to impart fire retardancy, chemical resistance, abrasion resistance, weatherability, color versatility, and the like. The present prefabricated gel coat, being dry, is easy to handle and can, if desired, be stored until needed. The fiber reinforcement not only adds integrity to the gel coat in its partially cured stage, but allows it to be cut, trimmed, or otherwise shaped prior to be fitted into a mold and finally cured. When the present gel coat is used to line the interior of a mold, it may be simultaneously cured with a resin back-up system forming the bulk of the product to be molded. This cannot be accomplished with conventional liquid gel coats which are applied and cured in procedural steps that are separate from their lamination to another resinous body.

Although the foregoing describes several preferred embodiments of the present invention, it is understood that the invention may be practiced in still other forms within the scope of the following claims.

We claim:

1. A process for molding a gel coat onto a product formed from a curable, moldable resin composition in a mold therefor, comprising:
   a. fitting along a surface of said mold a dry, flexible prefabricated gel coat comprising a sheet of substantial uniform thickness of a partially cured, curable, thermosetting polyester resin and a fibrous reinforcing medium of thermoplastic resin compatible with the polyester resin;
   b. introducing into said mold and against a surface of said sheet remote from the mold a moldable resin composition selected from the group consisting of epoxy resins and polyester resins;
   c. heating the dry gel coat to soften both the thermoplastic fibers and the partially cured polyester resin of the gel coat, flowing and shaping the softened thermoplastic fibers and partially cured polyester resin to a desired shape determined by the mold;
   d. continuing to heat the gel coat to bring about a final cure of said partially cured polyester resin while maintaining the temperature at a level whereby at least some of the thermoplastic fibers retain their fibrous form;

e. finally curing said moldable resin composition to bring about bonding at the point of contact of said gel coat and said moldable resin composition while maintaining the temperature at a level whereby at least some of the thermoplastic fibers retain their fibrous form and to form said product from said moldable resin composition having a gel coat molded thereon; and f. removing said product from the mold.

2. The process of claim 1 comprising substantially simultaneously curing said resin composition and finally curing the curable polyester resin of said gel coat to form a product of the curable resin composition having a covering of said gel coat.

3. The process of claim 1 in which said thermosetting polyester resin of the gel coat is an unsaturated polyester resin adapt to cross-link, and said unsaturated polyester resin contains an unsaturated cross-linker.

4. The process of claim 3 in which said cross-linker is solid at room temperatures to facilitate retention of the dryness of said prefabricated gel coat.

5. The process of claim 1 in which said thermoplastic fibers comprise a saturated polyester resin.

* * * * *